United States Patent [19]
Nickerson

[11] Patent Number: 5,638,068
[45] Date of Patent: Jun. 10, 1997

[54] PROCESSING IMAGES USING TWO-DIMENSIONAL FORWARD TRANSFORMS

[75] Inventor: Brian R. Nickerson, Aloha, Oreg.

[73] Assignee: Intel Corporation, Santa Clara, Calif.

[21] Appl. No.: 456,902

[22] Filed: Jun. 1, 1995

Related U.S. Application Data

[63] Continuation-in-part of Ser. No. 234,785, Apr. 28, 1994, which is a continuation-in-part of Ser. No. 158,855, Nov. 24, 1993.
[51] Int. Cl.$^6$ .................................................. H03M 7/46
[52] U.S. Cl. ............................................................. 341/67
[58] Field of Search .............................. 341/67, 51, 50, 341/106; 395/127, 136, 137, 138, 139; 364/825, 725

[56] References Cited

U.S. PATENT DOCUMENTS

| | | |
|---|---|---|
| 4,302,775 | 11/1981 | Widergren et al. . |
| 4,449,194 | 5/1984 | Wilhelm . |
| 4,698,689 | 10/1987 | Tzou . |
| 4,791,598 | 12/1988 | Liou et al. . |
| 4,829,465 | 5/1989 | Knauer et al. . |
| 5,029,122 | 7/1991 | Uetani . |
| 5,054,103 | 10/1991 | Yasuda et al. . |
| 5,107,345 | 4/1992 | Lee . |
| 5,157,488 | 10/1992 | Pennebaker . |
| 5,196,933 | 3/1993 | Henot . |
| 5,204,944 | 4/1993 | Wolberg et al. ................ 395/127 |
| 5,224,062 | 6/1993 | McMillan, Jr. et al. . |
| 5,235,420 | 8/1993 | Gharavi . |
| 5,249,146 | 9/1993 | Uramoto . |
| 5,253,192 | 10/1993 | Tufts . |
| 5,260,782 | 11/1993 | Hui . |
| 5,333,212 | 7/1994 | Ligtenberg . |
| 5,341,318 | 8/1994 | Balkanski et al. . |
| 5,367,629 | 11/1994 | Chu et al. . |
| 5,371,611 | 12/1994 | Kato et al. . |
| 5,414,469 | 5/1995 | Gonzales et al. . |
| 5,446,495 | 8/1995 | Tourtier et al. . |
| 5,475,803 | 12/1995 | Stearns et al. ................ 395/136 |

OTHER PUBLICATIONS

Allen et al., "The Multiply–Free Chen Transform—A Rational Approath to JPFG," 1991.

Shapiro, Jerome M. "An Embedded Hierarchical Image Coder Using Zerotrees of Wavelet Coefficients." The David Sarnoff Research Center, a Subsidiary of SRI International, Princeton, NJ 08543–5300. To appear in Proc. Data Compression Conference, Snowbird, UT, 1993.

DeVore, Ronald A., et al., "Image Compression Through Wavelet Transform Coding." IEEE Transactions on Information Theory, vol. 38, No. 2, Mar. 1992.

Shapiro, Jerome M., "An Embedded Wavelet Hierarchical Image Coder," The David Sarnoff Research Center, a Subsidiary of SRI International, Princeton, NJ 08543–5300, Proc. Int. Conf. On Acoustics, Speech, and Signal Processing (ICASSP), San Franncisco, CA, Mar. 23–26, 1992, vol. IV. pp. 657–660.

Practical Fast 1–D DCT Algorithms with 11 Multiplications, by Christoph Loeffler, Adriaan Ligtenberg, and George S. Moschytz, 1989 IEEE; pp. 988–991.

(List continued on next page.)

*Primary Examiner*—Brian K. Young
*Attorney, Agent, or Firm*—Steve Mendelsohn; William H. Murray

[57] ABSTRACT

Images are encoded by applying a two-dimensional forward transform to blocks of pixels or pixel differences to generate transform coefficients for each block. The two-dimensional transform is decomposed into two phases: (1) a first phase in which a first one-dimensional transform (e.g., a row transform) is applied to the input block using forward mapping, where the inputs are used as indices to lookup tables to retrieve contributions to intermediate coefficients, and (2) a computational phase in which a second one-dimensional transform (e.g., a column transform) is applied to the intermediate coefficients to generate the transform coefficients. In a preferred embodiment, a forward discrete slant transform is implemented using pseudo-SIMD techniques to reduce the total numbers of lookup tables, table lookups, and column transform computations.

48 Claims, 9 Drawing Sheets

OTHER PUBLICATIONS

IEEE Standard Specifications for the Implementations of 8×8 Inverse Discrete Cosine Transform, IEEE Std. 1/80–1990, Jul. 16, 1992; 14 pages.

Prioritized DCT for Compression and Progressive Transmission of Images, by Yunming Huang, Howard M. Dreizen, and Nikolas P. Galatsanos, Members, IEEE, published by IEEE Transactions on Image Processing, vol. 1 No. 4, dated Oct. 1992; pp. 477–487.

Discrete Cosine Transform Algorithms, Advantages, Applications, by K.R. Rao and P. Yip, published by Academic Press, Inc., dated 1990; 33 pages.

Wavelets and Image Compression by John C. Huffman, SMPTE Journal, Nov. 1994, pp. 723–727.

"A Forward–Mapping Realization of the Inverse Discrete Cosin Transform", by Leonard McMillan and Lee Westover, Sun Microsystems, Inc., Research Triangle Park, NC 27709, 0–8186–2717–4/92 1992 IEEE, pp. 219–228.

FIG. 5

PROCESSING IMAGES USING TWO-DIMENSIONAL FORWARD TRANSFORMS

CROSS-REFERENCES TO RELATED APPLICATIONS

This is a continuation-in-part of application Ser. No. 08/234,785, filed Apr. 28, 1994 as attorney docket number 366403-993, which is a continuation-in-part of application Ser. No. 08/158,855, filed Nov. 24, 1993 as attorney docket number 366403-817. The disclosure of application Ser. No. 08/234,785 is incorporated herein by reference in its entirety. The disclosure of application Ser. No. 08/182,758, filed Jan. 14, 1994 as attorney docket number 366403-745 is also incorporated herein by reference in its entirety.

BACKGROUND OF THE INVENTION

1. Field of the Invention

The present invention relates to image processing, and, in particular, to computer-implemented processes and apparatuses for encoding and/or decoding video signals for storage, transmission, and/or playback.

2. Description of the Related Art

Many conventional video codecs (i.e., encoder/decoder) employ a two-dimensional block transform, such as a discrete cosine transform or a discrete slant transform, as part of the video encoding process. These block transforms are typically used to transform pixels (or pixel differences) from a spatial domain into transformed coefficients in a spatial frequency domain. The resulting transformed coefficients may then be further processed (e.g., using quantization followed by run-length encoding followed by variable-length encoding) to generate an encoded bitstream that represents the original video signals in a compressed format.

Two-dimensional transforms are typically implemented in two different ways. One way is to generate each output (i.e., each transform coefficient) as a function of all of the inputs. For example, for an (8×8) transform that transforms an (8×8) block of inputs into 64 transform coefficients, each of the 64 transform coefficients may be represented by a different function of the 64 inputs. In practice, the 64 different functions will typically share common subexpressions. In order to make implementation more efficient, each shared subexpression may be performed once and the result stored in temporary storage and then used multiple times for those different functions in which it appears. For discrete slant and cosine transforms, for example, there are six different levels of shared subexpressions (three as the inputs are transformed rowwise and three more as the inputs are transformed columnwise), each level having one or more different subexpressions. This method of performing transforms is computationally intensive. It also requires repeated storage and retrieval of the results of the different subexpressions.

The other common implementation, known as a forward mapping transform, is to process each input completely by generating the contribution of each input to all of the outputs before considering the next input. This implementation requires the use of multiple registers to keep track of the partial outputs as the contributions from the different inputs are accumulated. For an (8×8) transform with 64 outputs, even assuming the use of pseudo-SIMD techniques (in which two or more outputs are accumulated in a single register), the forward mapping transform requires more registers than are available in many computer architectures. The alternative is to store these accumulated partial outputs to memory, but this results in excessive memory traffic which causes processing speed to be reduced.

What is needed are video codecs that apply two-dimensional block transforms as part of their video compression processing without the problems of the known techniques. In particular, it is desirable to implement two-dimensional block transforms efficiently, where efficiently means achieving relatively high processing speed with low memory traffic, good memory cache behavior, and few registers.

It is therefore an object of the present invention to provide processes and apparatuses for encoding and/or decoding video images using two-dimensional block transforms without the disadvantages of the prior art.

Further objects and advantages of this invention will become apparent from the detailed description of a preferred embodiment which follows.

SUMMARY OF THE INVENTION

The present invention comprises a computer-implemented process and an apparatus for encoding images, as well as a computer program embodied in a tangible medium. According to a preferred embodiment, input signals corresponding to an image are divided into a plurality of blocks. A two-dimensional forward transform is applied to the input signals of each of the blocks to generate a plurality of transformed signals for each of the blocks. Encoded signals are generated for the image using the transformed signals for each of the blocks. For the two-dimensional forward transform of the input signals of each of the blocks, (1) a first one-dimensional transform is applied to the input signals to generate intermediate signals using forward mapping, wherein the input signals are used as indices to lookup tables that indicate contributions of the input signals to the intermediate signals; and (2) a second one-dimensional transform is applied to the intermediate signals to generate the transformed signals.

The present invention also comprises a computer-implemented process and an apparatus for decoding encoded images, as well as a computer program embodied in a tangible medium. According to a preferred embodiment, encoded signals corresponding to an image are decoded to generate a decoded image which is then displayed. The encoded signals were generated by (a) dividing input signals corresponding to the image into a plurality of blocks; (b) applying a two-dimensional forward transform to the input signals of each of the blocks to generate a plurality of transformed signals for each of the blocks; and (c) generating encoded signals for the image using the transformed signals for each of the blocks, wherein, for the input signals of each of the blocks, step (b) comprises the steps of (1) applying a first one-dimensional transform to the input signals to generate intermediate signals using forward mapping, wherein the input signals are used as indices to lookup tables that indicate contributions of the input signals to the intermediate signals; and (2) applying a second one-dimensional transform to the intermediate signals to generate the transformed signals.

BRIEF DESCRIPTION OF THE DRAWINGS

Other objects, features, and advantages of the present invention will become more fully apparent from the following detailed description of preferred embodiment(s), the appended claims, and the accompanying drawings in which:

FIG. 5 is a representation of a preferred sequence of processing the blocks and macroblocks of each component plane of each video frame during video encoding;

DESCRIPTION OF PREFERRED EMBODIMENT(S)

The present invention is directed to systems that process image signals, where the image signals are encoded using two-dimensional forward block transforms. According to one embodiment, the forward block transform is applied to input signals in a two-phase process. The first phase is the application of a first one-dimensional forward transform in a forward mapping manner. In this first phase, the input signals are used as indices to lookup tables. The entries of the lookup tables am the contributions of the input signals to intermediate coefficients that are accumulated in a pseudo-SIMD manner. In the second phase, a second one-dimensional forward transform is applied in a computational manner to the intermediate coefficients using pseudo-SIMD processing to generate the transform coefficients.

Point-To-Point Conferencing Network

Figure 1:
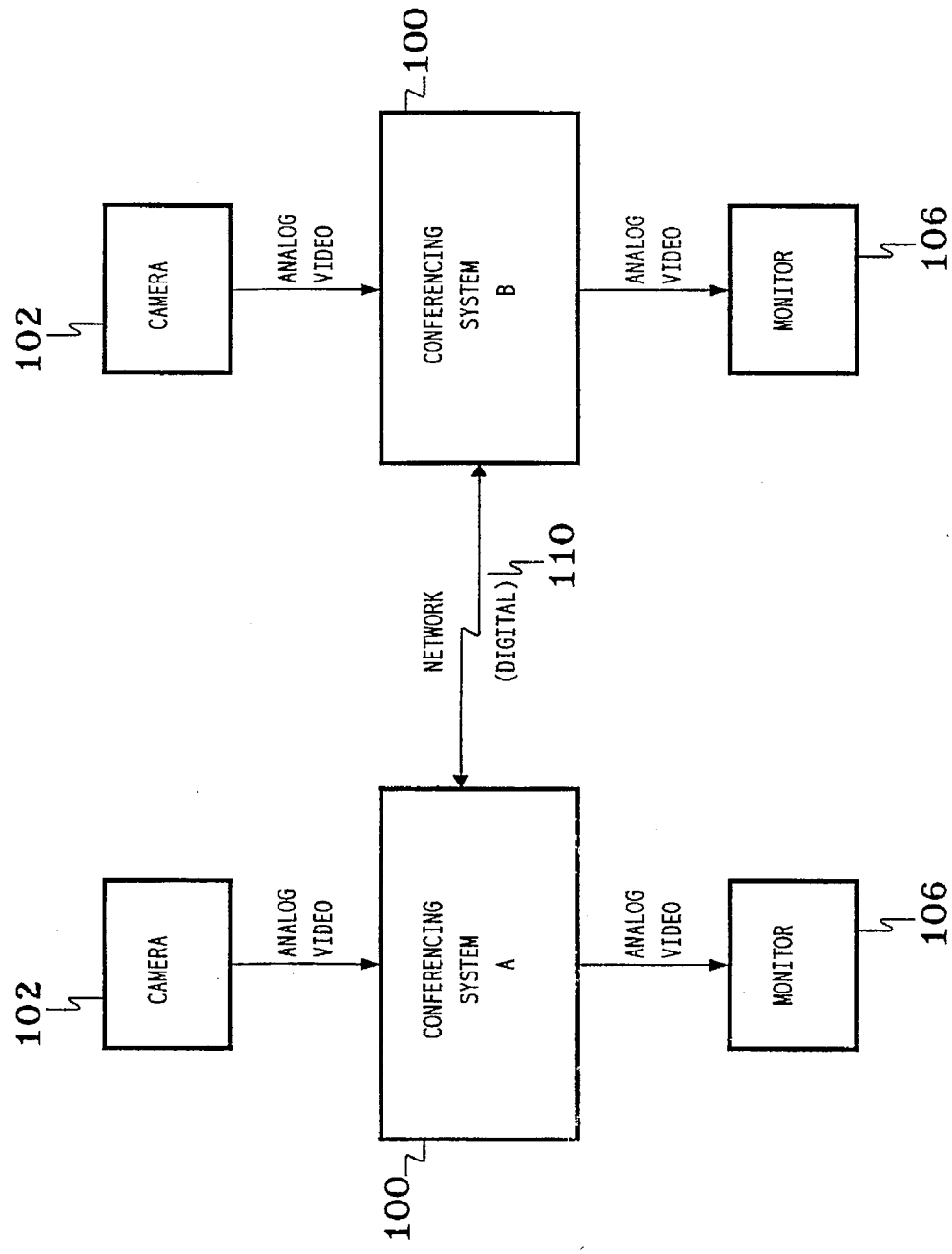
FIG. 1 is a block diagram representing real-time point-to-point video conferencing between two PC systems, according to a preferred embodiment of the present invention.

Referring now to FIG. 1, there is shown a block diagram representing real-time point-to-point video conferencing between two PC systems, according to a preferred embodiment of the present invention. Each PC system has a conferencing system 100, a camera 102, and a monitor 106. The conferencing systems communicate via a digital network 110, such as an integrated services digital network (ISDN) or local area network (LAN). Each conferencing system 100 receives, digitizes, and compresses the analog video signals generated by camera 102. The compressed digital video signals are transmitted to the other conferencing system via network 110, where they are decompressed and converted for display in a window on monitor 106. Each conferencing system 100 may also display the locally generated video signals in a separate window on monitor 106 for monitoring of the local video processing.

Camera 102 may be any suitable camera for generating NTSC or PAL analog video signals. Those skilled in the art will understand that, in alternative embodiments of the present invention, camera 102 may be replaced by any other suitable source of unencoded video signals, such as a VCR for playing back recorded unencoded video signals or an antenna or cable for receiving unencoded video signals from a remote location. Monitor 106 may be any suitable monitor for displaying video and graphics images and is preferably a VGA monitor.

Conferencing System Hardware Configuration

Figure 2:
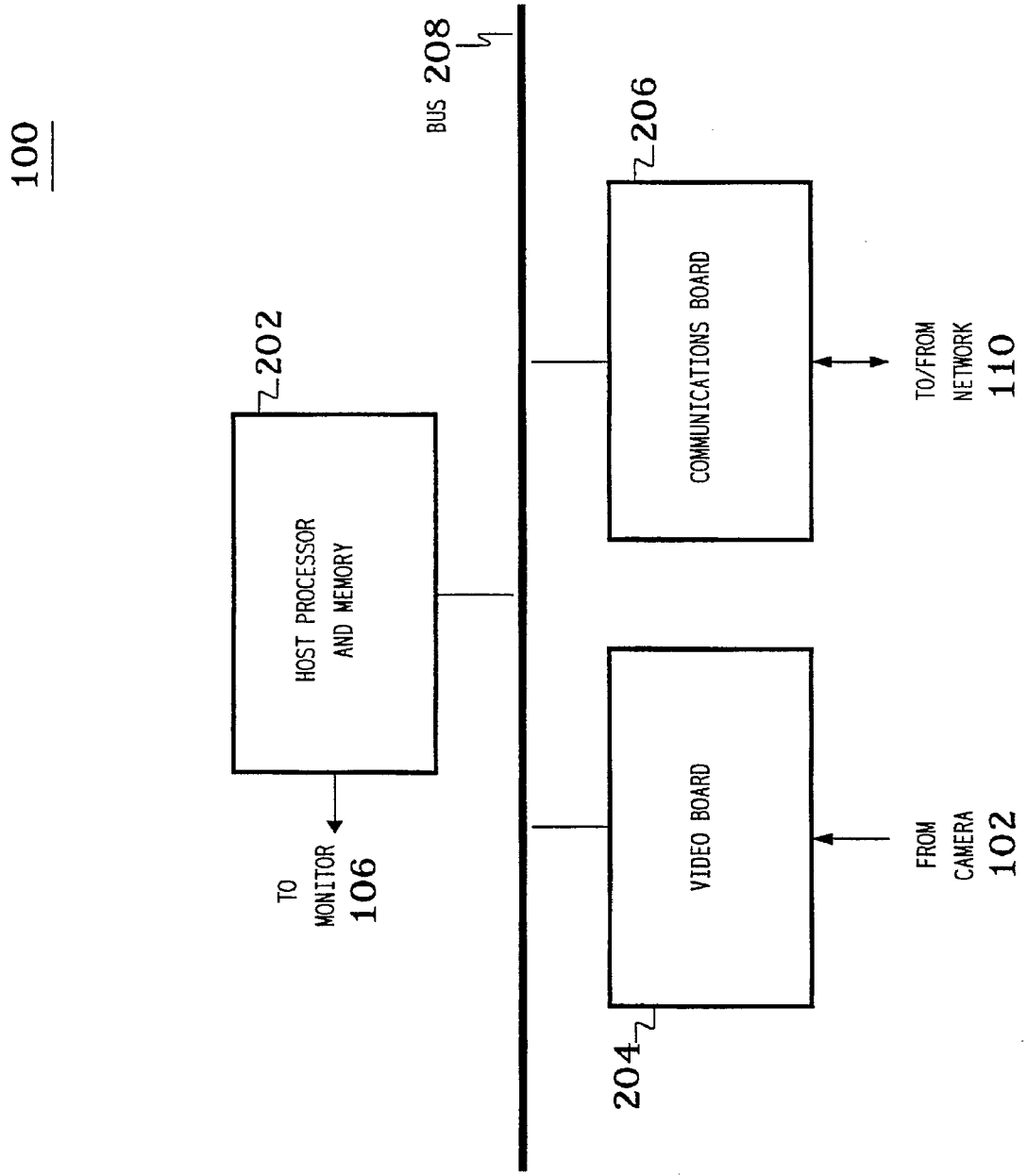
FIG. 2 is a block diagram of the hardware configuration of the conferencing system of each PC system of FIG. 1.

Referring now to FIG. 2, there is shown a block diagram of the hardware configuration of each conferencing system 100 of FIG. 1, according to a preferred embodiment of the present invention. Each conferencing system 100 comprises host processor 202, video board 204, communications board 206, and bus 208.

Figure 3:
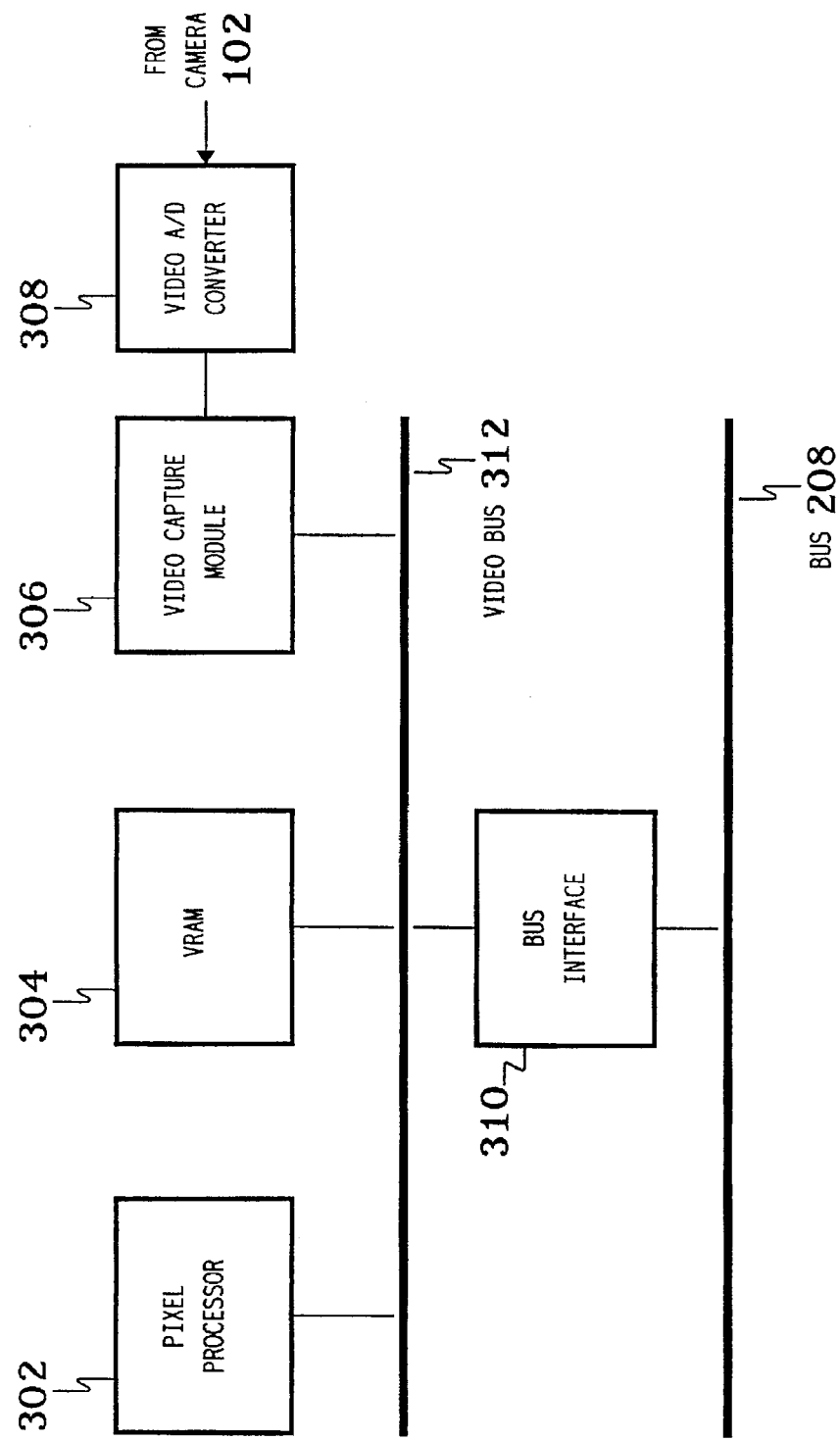
FIG. 3 is a block diagram of the hardware configuration of the video board of the conferencing system of FIG. 2.

Referring now to FIG. 3, there is shown a block diagram of the hardware configuration of video board 204 of FIG. 2, according to a preferred embodiment of the present invention. Video board 204 comprises bus interface 310, video bus 312, pixel processor 302, video random access memory (VRAM) device 304, video capture module 306, and video analog-to-digital (A/D) converter 308.

Video Signal Processing

Referring to FIGS. 2 and 3, software running on host processor 202 provides the top-level local control of video conferencing between a local conferencing system (i.e., local site, local node, or local endpoint) and a remote conferencing system (i.e., remote site, remote node, or remote endpoint). Host processor 202 controls local video signal processing and establishes links with the remote site for transmitting and receiving audio and video signals over the digital network 110.

During video conferencing, video A/D converter 308 of video board 204 digitizes analog video signals received from camera 102 and transmits the resulting digitized video to video capture module 306. Video capture module 306 decodes the digitized video into YUV color components and delivers subsampled digital YUV9 (i.e., YUV 4:1:1) video bitmaps to VRAM 304 via video bus 312. Video microcode running on pixel processor 302 compresses the subsampled video bitmaps and stores the resulting compressed video signals back to VRAM 304. Bus interface 310 then transmits via bus 208 the compressed video to host processor 202. Host processor 202 transmits the compressed video signals to communications board 206 via bus 208 for transmission to the remote site over network 110.

In addition, communications board 206 receives from network 110 compressed video signals generated by the remote site and transmits the compressed video signals to host processor 202 via bus 208. Host processor 202 decompresses the compressed video signals and transmits the decompressed video to the graphics device interface (GDI) (not shown) of the operating system (for example, Microsoft® Windows) for eventual display in a display window on monitor 106.

Those skilled in the art will understand that, if there is sufficient processing bandwidth, the video compression processing of the present invention may alternatively be implemented by host processor 202. Similarly, the video decompression processing of the present invention may alternatively be implemented by pixel processor 302.

Preferred Hardware Configuration for Conferencing System

Referring again to FIG. 2, host processor 202 may be any suitable general-purpose processor and is preferably an Intel® i486™ or Pentium™ microprocessor. Host processor 202 preferably has at least 8 megabytes of host memory. Bus 208 may be any suitable digital communications bus and is preferably an industry standard architecture (ISA) or extended ISA (EISA) bus. Communications board 206 may be any suitable hardware/software for performing communications processing for conferencing system 100.

Referring again to FIG. 3, video A/D converter 308 of video board 204 may be any standard hardware for digitizing and decoding analog video signals that are preferably NTSC or PAL standard video signals. Video capture module 306 may be any suitable device for capturing digital video color component bitmaps and is preferably an Intel®

ActionMedia-II® capture module. Video capture module 306 preferably captures video as subsampled 4:1:1 YUV bitmaps (i.e., YUV9 or YVU9). Memory 304 may be any suitable computer memory device for storing data during video processing such as a random access memory (RAM) device and is preferably a video RAM (VRAM) device with at least 1 megabyte of data storage capacity. Pixel processor 302 may be any suitable processor for compressing video data and is preferably an Intel® pixel processor such as an Intel® i750PE™ Pixel Processor. Video bus 312 may be any suitable digital communications bus and is preferably an Intel® PCI® bus. Bus interface 310 may be any suitable interface between bus 208 and video bus 312.

Video Signal Encoding

Figure 4:
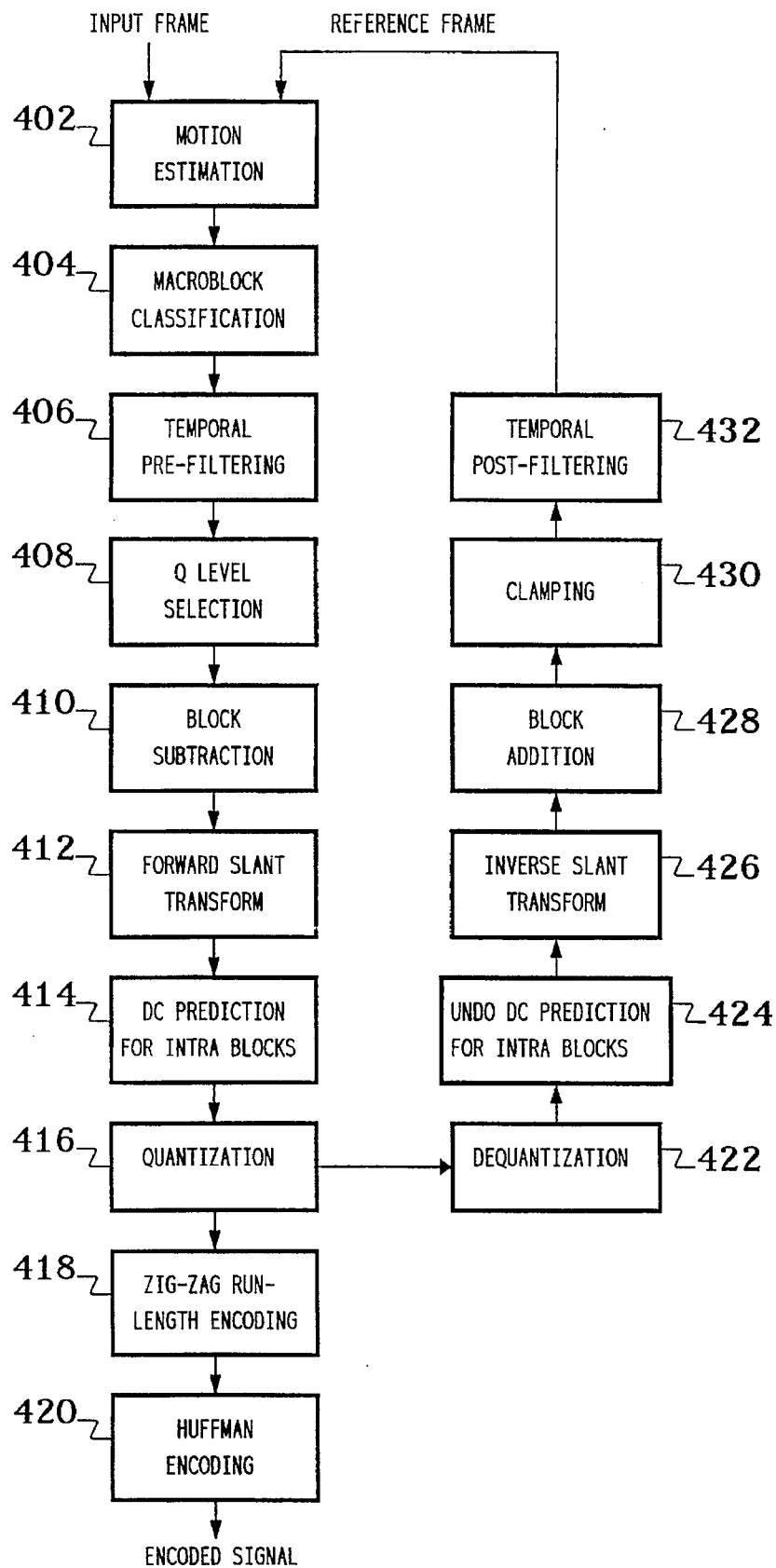
FIG. 4 is a top-level flow diagram of the processing implemented by the pixel processor of FIG. 3 to compress subsampled YUV9 video signals.

Referring now to FIG. 4, there is shown a top-level flow diagram of the processing implemented by pixel processor 302 of FIG. 3 to compress (i.e., encode) the subsampled YUV9 video signals generated by video capture module 306 and stored to VRAM 304, according to a preferred embodiment of the present invention. YUV9 video signals comprise sequences of video frames having three planes of 8-bit component signals (Y, U, and V) with U and V subsampled by 4× in both directions. Thus, for every (4×4) block of Y component signals, there is one U component signals and one V component signal.

Pixel processor 302 preferably encodes each component plane independently for each video frame with no grouping or interleaving of the component signals. The component planes are preferably encoded in the order Y, V, and U. For purposes of encoding, each component plane is subdivided into a grid of (16×16) macroblocks. Each macroblock is further divided into a set of four (8×8) blocks.

Figure 5:
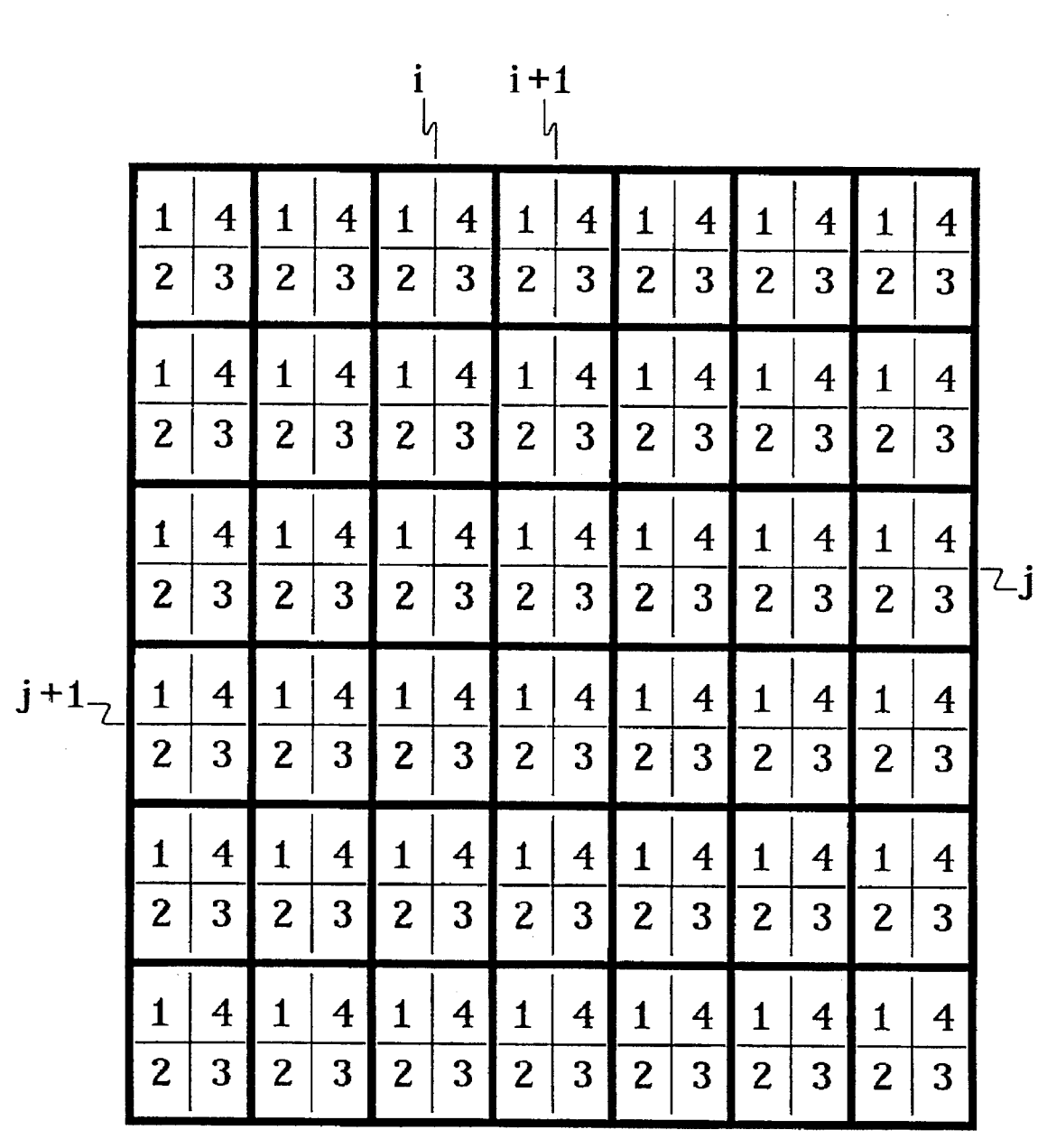

Referring now to FIG. 5, there is shown a representation of a preferred sequence of processing the blocks and macroblocks of each component plane of each video frame during encoding (and decoding). The macroblocks of each component plane are traversed in raster-scan order starting at the top-left corner (i.e., macroblock i+1 immediately following macroblock i and macroblock j+1 immediately following macroblock j), while the blocks within each macroblock are processed in the order top-left (block 1), bottom-left (block 2), bottom-right (block 3), and top-right (block 4). As a result, for adjacent macroblocks i and i+1, block 4 of macroblock i is adjacent to block 1 of macroblock i+1.

Referring again to FIG. 4, the encoder begins video signal encoding for the current input frame by performing motion estimation (step 402 of FIG. 4). Motion estimation generates a motion vector for each (16×16) macroblock of each component plane of the current frame. The motion vector specifies the (16×16) macroblock of the reference frame that most closely matches the macroblock of the current frame (within specified ranges of allowable motion). The reference frame (i.e., companded frame) is the result of compressing and expanding the previous input frame.

After motion estimation, each macroblock is classified as to whether it is to be encoded as an inter macroblock or an intra macroblock (step 404). An inter macroblock is encoded with respect to the corresponding motion-compensated macroblock of the reference frame. An intra macroblock is not encoded with respect to any previous frame. After macroblock classification, a temporal pre-filter is optionally applied to the intra macroblocks of the current input frame (step 406). Other filtering, including spatial filtering, may also be optionally applied to the intra and/or inter macroblocks during the encoding processing.

After any temporal pre-filtering, a quantization level is selected for each macroblock (step 408). The quantization level identifies the quantization table used in quantization (step 416), as described below. Block subtraction is then applied to all those (8×8) blocks that are part of macroblocks to be encoded as inter macroblocks (step 410). Block subtraction involves generating the differences between the components of a temporally pre-filtered block of the current frame and the corresponding components of the corresponding motion-compensated block of the reference frame.

A forward discrete slant transform (FDST) is then applied (step 412). For inter blocks, the FDST is applied to the component differences generated during block subtraction. For intra blocks, the FDST is applied to the temporally pre-filtered component values. The forward discrete slant transform is described in further detail later in this specification in the section entitled "Forward Transform." The result of applying the FDST to an (8×8) block in the pixel component domain is an (8×8) block of DST coefficients in the spatial frequency domain.

If the current block is an intra block, then the DC coefficient (i.e., the (0,0) DST coefficient in the (8×8) block) is encoded as a predicted value with respect to prevDC, where prevDC is the DC coefficient of the previous intra block in the current slice (following the block scanning sequence of FIG. 5) (step 414). The value that is encoded is the difference between the DC coefficient for the current block and prevDC.

Quantization is then applied to the blocks of DST coefficients (step 416) using the quantization table previously selected for the current block (in step 408) the current DST coefficient. Those skilled in the art will understand that, for typical blocks of YUV video component signals, many of the 64 DST coefficients are close enough to zero to be represented in the compressed video bitstream as zero without significant loss of video quality at playback.

Figure 6:
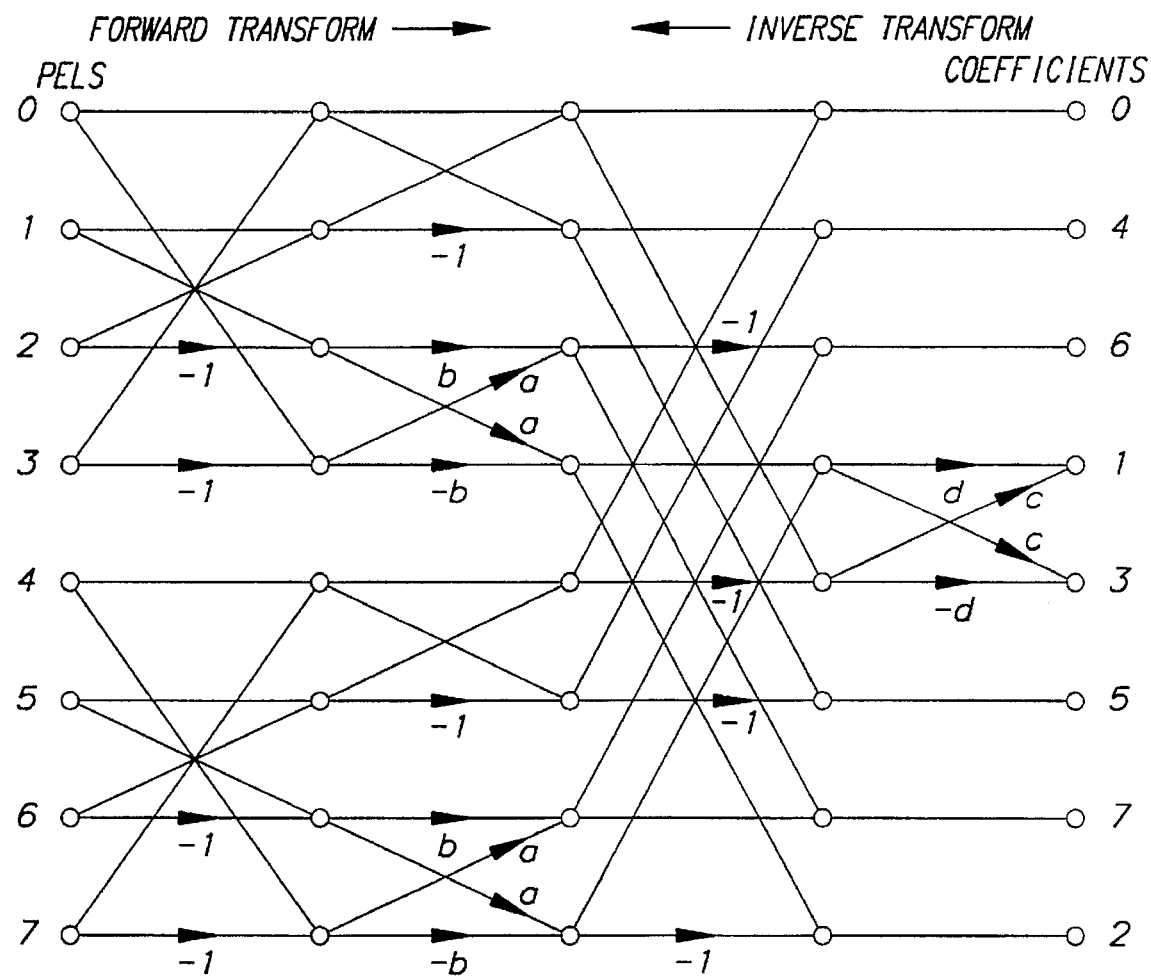
FIGS. 6 and 7 are a flow diagram and the basis vectors, respectively, of the forward and inverse discrete slant transforms of FIG. 4 used in the encoding (and decoding) of video images.

After quantization, the quantized DST coefficients are run-length encoded using the zig-zag scan sequence represented in FIG. 6 (step 418). The quantized DST coefficients are run-length encoded as run-val pairs comprising a run of sequential zero DST coefficients followed by a non-zero quantized DST coefficient. Common run-val pairs may be further encoded as a single value that represents an index to a run table and a val table. The run-val pairs (or run-val table indices) are then variable-length encoded using Huffman encoding (step 420) to generate the block signals of the encoded video bitstream.

A reference frame is generated corresponding to the current input frame for use in encoding the next input frame. The reference frame is generated by decoding the encoded video frame corresponding to the current input frame. Since zig-zag run-length encoding (step 418 of FIG. 4) and Huffman encoding (step 420) are lossless procedures (i.e., no information is lost), generation of the reference frame preferably begins with the quantized DST coefficients (generated at step 416).

The quantized DST coefficients are dequantized (step 422), the DC prediction for intra blocks is undone (step 424), and the inverse discrete slant transform (IDST) is applied to the resulting dequantized DST coefficients (step 426). If the block was encoded as an inter block, then block addition is performed to add the IDST results to the corresponding motion-compensated block of the previous reference frame (step 428). If the block was encoded as an intra block, then no block addition is performed. In either case, clamping is performed (step 430) and a temporal filter (of the same strength as the temporal pre-filter) is optionally applied to the clamped results of the inter macroblocks (step 432). Clamping limits the signals to be within a specified range, preferably between 8 and 120, inclusive. The output of the temporal post-filter is the reference frame used to encode the next input frame.

Those skilled in the art will understand that, in alternative embodiments, the reference frame may be generated from the encoded video frame by pixel processor 302 or by host processor 202.

Forward Transform

Figure 7:
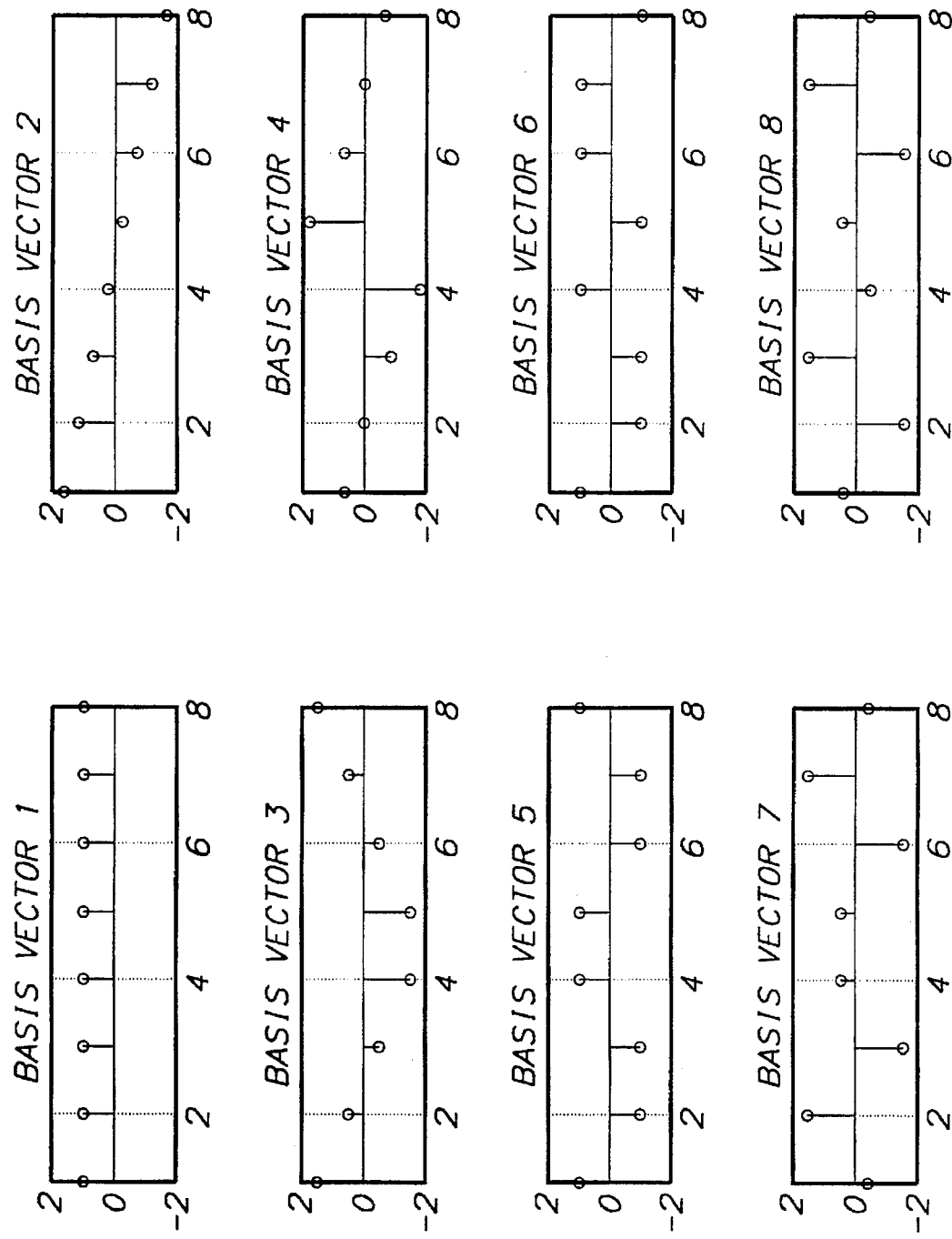

Referring now to FIGS. 6 and 7, there are shown a flow diagram and the basis vectors, respectively, of the forward and inverse discrete slant transforms (FDST 412 and IDST 426 of FIG. 4) used in the encoding (and decoding) of video images, according to a preferred embodiment of the present invention. Those skilled in the art will understand that the discrete slant transform of FIG. 6 is a separable, multiplierless (1×8) transform, in which all operations can be performed with shifts and adds. Such a transform may be implemented faster than other slant transforms and other transforms (e.g., some discrete cosine transforms) that require computationally expensive multiplications.

In the forward DST, a=9/16, b=11/8, and, in the inverse DST, a=1/2, b=5/4. In both cases, c=7/8 and d=1/2. The results of the IDST are also normalized by dividing by 8. In making the DST multiplierless, the transform is no longer orthogonal. In other words, the FDST followed by the IDST does not yield the original signal exactly. The justification for using such an imperfect transform is that, in the presence of all the other coding distortions, a small distortion from the transform is tolerable. An advantage is that the transform is multiplierless and thus very fast on Intel® i486™ and older processors.

Figure 8:
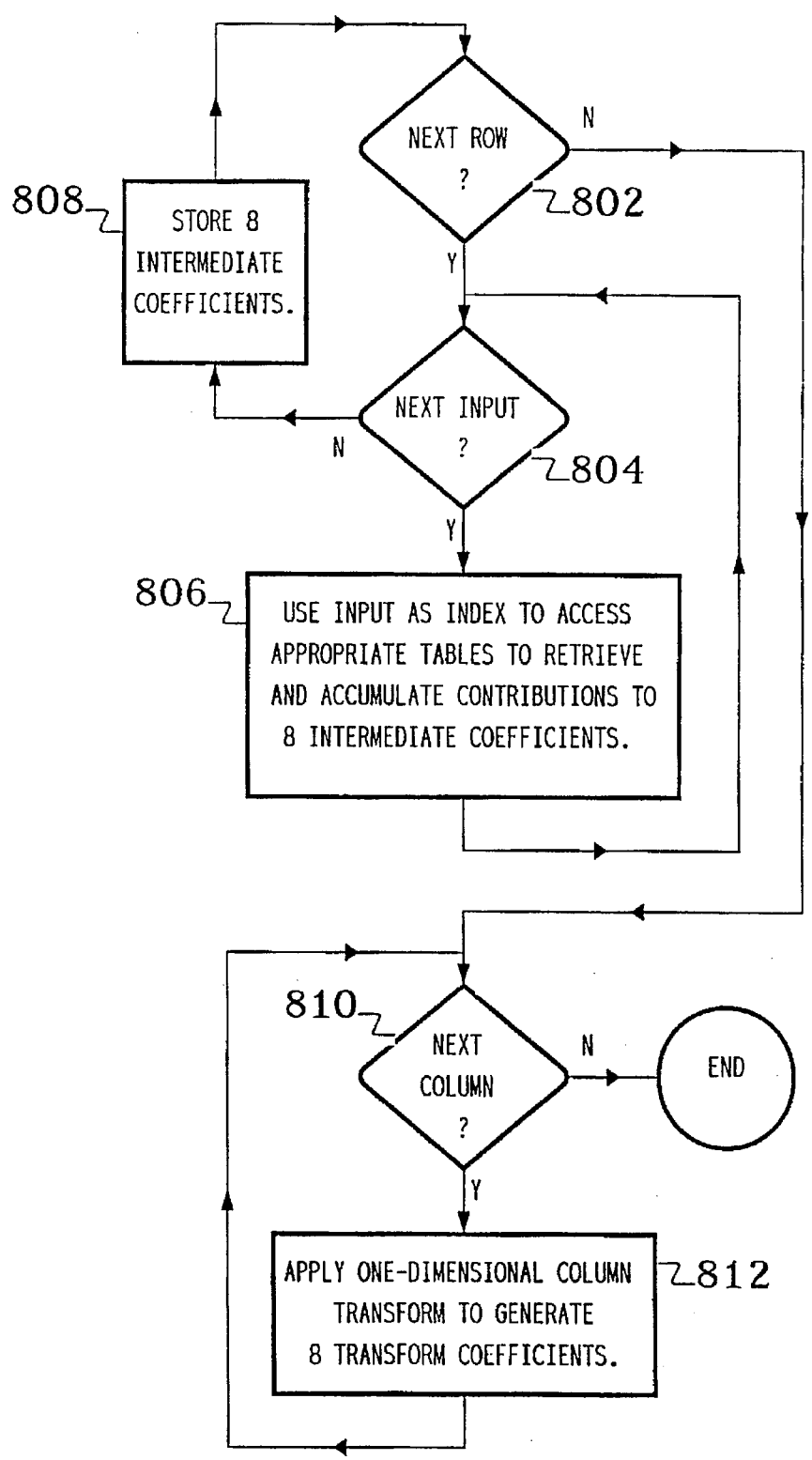
FIG. 8 is a flow diagram of the processing for the forward discrete slant transform of FIG. 6.

Referring now to FIG. 8, there is shown a flow diagram of the processing for the forward DST of FIG. 6, according to a preferred embodiment of the present invention. For FIG. 8, the (8×8) FDST of FIG. 6 is decomposed into the application of an (8×1) row transform to the eight rows of an (8×8) block of inputs to generate an (8×8) block of intermediate coefficients (ICs), followed by the application of a (1×8) column transform to the eight columns of the (8×8) IC block to generate an (8×8) block of transform coefficients.

The FDST processing of FIG. 8 comprises two phases: a first phase in which the row transform is applied to the inputs in a forward mapping manner using table lookups to generate the intermediate coefficients (steps 802–808) and a second phase in which the column transform is computationally applied to the IC block to generate the transform coefficients (steps 810–812). For the forward mapping phase, each input (e.g., pixel or pixel difference) is used as an index to tables that contain the contributions of that input to the eight ICs that result from the application of the row transform to the corresponding row of the input block. The computational phase involves the application of the column transform to each column of the IC block.

In particular, during the first phase, the FDST processing of FIG. 8 sequentially selects each input (step 804) of each row (step 802) of the block of inputs to be transformed. Each input is used as an index into tables whose entries are the contributions to the eight ICs that correspond to the current row (step 806). In a preferred embodiment of the present invention, the inputs are either 7-bit pixels (for intraframe encoding) or 8-bit pixel differences (for interframe encoding). For pixels, then, there are $2^7$ or 128 possible different contributions, while, for pixel differences, there are $2^8$ or 256 possible different contributions. Those skilled in the art will understand that using forward mapping with table lookups for the first phase of FDST processing provides fast implementation of the forward transform at the expense of storing a relatively small number of relatively small lookup tables.

After all eight inputs for the current row have been processed, the contributions to the eight corresponding ICs are fully accumulated and the ICs are stored (step 808) for further processing during the second phase of the FDST processing. After all eight rows have been fully processed (step 802), FDST processing continues to the beginning of the second phase (step 810).

During the second phase of FDST processing, for each column of the (8×8) IC block (step 810), the one-dimensional column transform is applied computationally to generate the corresponding column of the (8×8) block of transform coefficients (step 812). After all of the columns have been fully processed (step 810), the FDST processing is complete and an (8×8) block of transform coefficients has been generated.

Serial Implementation

The present invention applies to any two-dimensional transform that can be decomposed into two one-dimensional transforms, where the first one-dimensional transform is applied in a forward mapping manner using table lookups to generate an IC block, and the second one-dimensional transform is applied computationally to the IC block to generate the transform coefficients. In one embodiment, the first one-dimensional transform is a row transform that is repeatedly applied in a forward mapping manner to the rows of the input block and the second one-dimensional transform is a column transform that is repeatedly applied computationally to the columns of the IC block. Alternatively, the first one-dimensional transform may be a column transform and the second one-dimensional transform may be a row transform.

In a preferred embodiment, the two-dimensional transforms transform (8×8) blocks of inputs into (8×8) blocks of transform coefficients. In alternative embodiments, the input and output blocks do not have to be (8×8), nor do they need to be square or even the same size.

In one embodiment of the present invention, the FDST processing of FIG. 8 is implemented in a serial fashion. In the general case of a decomposable two-dimensional transform in which the one-dimensional row transform is applied first, the total number of lookup tables required for the forward-mapping phase of a serial implementation could be as high as the product of the number of columns in the input block times the number of columns in the IC block.

For example, for a (1×8) row transform that transforms an (8×8) block of inputs into an (8×8) IC block, as many as 64 different lookup tables could be needed. When applying the row transform to the first row of the input block, the first input of the first row contributes to each of the eight intermediate coefficients of the first row of the IC block. When implemented in a forward mapping manner using table lookups, the contributions of the first input of the first row may require as many as eight lookup tables. Similarly, the second input of the first row also contributes to each of the eight ICs of the first row of the IC block and may require another eight lookup tables. All told, applying the row transform to the first row of the input block may require as many as 64 lookup tables. Since the row transform is applied in identical fashion to each row of the input block, the 64 lookup tables are reused for the second through eighth row of the input block.

In practice, however, the number of different lookup tables used to perform the forward mapping phase may be significantly smaller than in the general case. For example, in one embodiment of the forward discrete slant transform, only 11 different lookup tables are used. This is due to the symmetries of the FDST that result in many of the contributions of the inputs to the ICs being retrieved from identical lookup tables.

Thus, in a serial implementation of the processing of FIG. 8, for each input of each row, step 806 involves eight table lookups to generate the contributions to eight ICs, where, for each table lookup, the input is used as the index to one of 11 different lookup tables. In this serial embodiment, the forward-mapping phase for each row involves 64 table lookups and, for the entire (8×8) input block, uses a total of 512 table lookups.

The second (i.e., computational) phase of the processing of FIG. 8 in a serial implementation involves the application of the (8×1) column transform eight times—once to each of the eight columns of the (8×8) IC block.

Pseudo-SIMD Implementation

In a preferred embodiment of the present invention, the FDST processing of FIG. 8 is implemented using pseudo-SIMD techniques. Pseudo-SIMD refers to the storage of two or more values into a single computer register and the subsequent manipulation of that register (i.e., by performing computer operations on the register), wherein the register contents are treated as a single value. Those skilled in the art will understand that such pseudo-SIMD processing can be used to simulate single-instruction, multiple-data (SIMD) parallel processing on a serial processor. For example, in a 32-bit serial processor such as an Intel® i486™ or Pentium™ processor, a single 32-bit register can be loaded with two 8-bit values and then manipulated thereby applying a computer operation simultaneously to both 8-bit values. Alternatively, 32-bit registers may be used to manipulate four 8-bit values or two 16-bit values in pseudo-SIMD fashion. Pseudo-SIMD processing is described in further detail in application Ser. NO. 08/182,758, filed Jan. 14, 1994 as attorney docket number 366403-745.

In a preferred embodiment of the present invention, pseudo-SIMD techniques are used (1) to accumulate the ICs during the first phase of FDST processing and (2) during the computational second phase in which the column transform is applied to the IC block.

First Phase: Row Transform

During the first phase of FDST processing, each input contributes to the eight intermediate coefficients of the corresponding row of the IC block. In a preferred pseudo-SIMD implementation, the lookup tables are constructed to retrieve two contributions with each table lookup. For example, a single table lookup is used to retrieve the contributions of an input to the ICs of both column 0 and column 2, where the column 0 and column 2 contributions are stored into a single register in pseudo-SIMD fashion. Equation (1) represents the sum of the contributions from all eight inputs of each row to the column 0 and column 2 ICs for that row, such that:

$$IC02[r] = +P128P176[PD[r][0]] \qquad (1)$$
$$+P128P72\ [PD[r][1]]$$
$$+P128N72\ [PD[r][2]]$$
$$+P128N176[PD[r][3]]$$
$$+P128N176[PD[r][4]]$$
$$+P128N72\ [PD[r][5]]$$
$$+P128P72\ [PD[r][6]]$$
$$+P128P176[PD[r][7]]$$
$$+SKEW[r];$$

where:

IC02[r] are the intermediate coefficients for column 0 and column 2 of row r stored into a single 32-bit register in pseudo-SIMD fashion;

P128P176 is a single lookup table;

P128P72, P128N72, P128N176, and SKEW are four other lookup tables;

PD is the (8×8) block of inputs (i.e., either pixels or pixel differences); and

PD[r][c] is the input at row r and column c of the input block, which is used as an index to the lookup tables.

The lookup table SKEW is defined as follows:

SKEW[0]=24*2048;
SKEW[1]=8*2048;
SKEW[2]=0*2048;
SKEW[3]=0*2048;
SKEW[4]=16*2048;
SKEW[5]=8*2048;
SKEW[6]=0*2048;
SKEW[7]=0*2048;

Similarly, the contributions to the ICs for columns 1 and 3, columns 4 and 6, and columns 5 and 7 are grouped together in lookup tables, as shown in the following Equations (1)–(3):

$$IC13[r] = +P200P90\ [PD[r][0]] \qquad (2)$$
$$+P148N1\ [PD[r][1]]$$
$$+P76N127\ [PD[r][2]]$$
$$+P24N218\ [PD[r][3]]$$
$$+P24N218\ [PD[r][4]]$$
$$+P76N127\ [PD[r][5]]$$
$$+P148N1\ [PD[r][6]]$$
$$+P200P90\ [PD[r][7]]$$
$$+SKEW[r];$$

$$IC46[r] = +P128N72\ [PD[r][0]] \qquad (3)$$
$$+P128N176[PD[r][1]]$$
$$+P128P176[PD[r][2]]$$
$$+P128P72\ [PD[r][3]]$$
$$+P128P72\ [PD[r][4]]$$
$$+P128P176[PD[r][5]]$$
$$+P128N176[PD[r][6]]$$
$$+P128N72\ [PD[r][7]]$$
$$+SKEW[r];$$

$$IC57[r] = \begin{aligned} &\text{-continued} \\ &+ P128P72\ [PD[r][0]] \\ &- P128P176[PD[r][1]] \\ &- P128N176[PD[r][2]] \\ &+ P200P90\ [PD[r][3]] \\ &- P128N72\ [PD[r][4]] \\ &+ P128N176[PD[r][5]] \\ &+ P128P176[PD[r][6]] \\ &- P128P72\ [PD[r][7]] \\ &+ SKEW[r]; \end{aligned} \quad (4)$$

where:

IC13[r], IC46[r], and IC57[r] are the intermediate coefficients for columns 1 and 3, columns 4 and 6, and columns 5 and 7, respectively, of row r stored into three 32-bit registers in pseudo-SIMD fashion; and P200P90, P148N1, P76N127, and P24N218 are four other lookup tables.

Each of the PxxxPyyy and PxxxNyyy lookup tables are indexed by an input (i.e., a pixel or pixel difference). Each entry stored in a lookup table corresponds to the input times two fixed numbers of 128ths. In general, the ith entry of lookup table PxxxPyyy contains (i*xxx)/128 stored in bits 18–31 of the high-order field of the 32-bit table entry and (i*yyy)/128 stored in bits 0–13 of the low-order field of the 32-bit table entry, where the sign is extended through bit 31. Similarly, the ith entry of lookup table PxxxNyyy contains (i*xxx)/128 stored in bits 18–31 of the high-order field of the 32-bit table entry and (i*(-yyy))/128 stored in bits 0–13 of the low-order field of the 32-bit table entry. In the lookup table notation, "P" stands for a positive number of 128ths and "N" stands for a negative number of 128ths.

Figure 9:
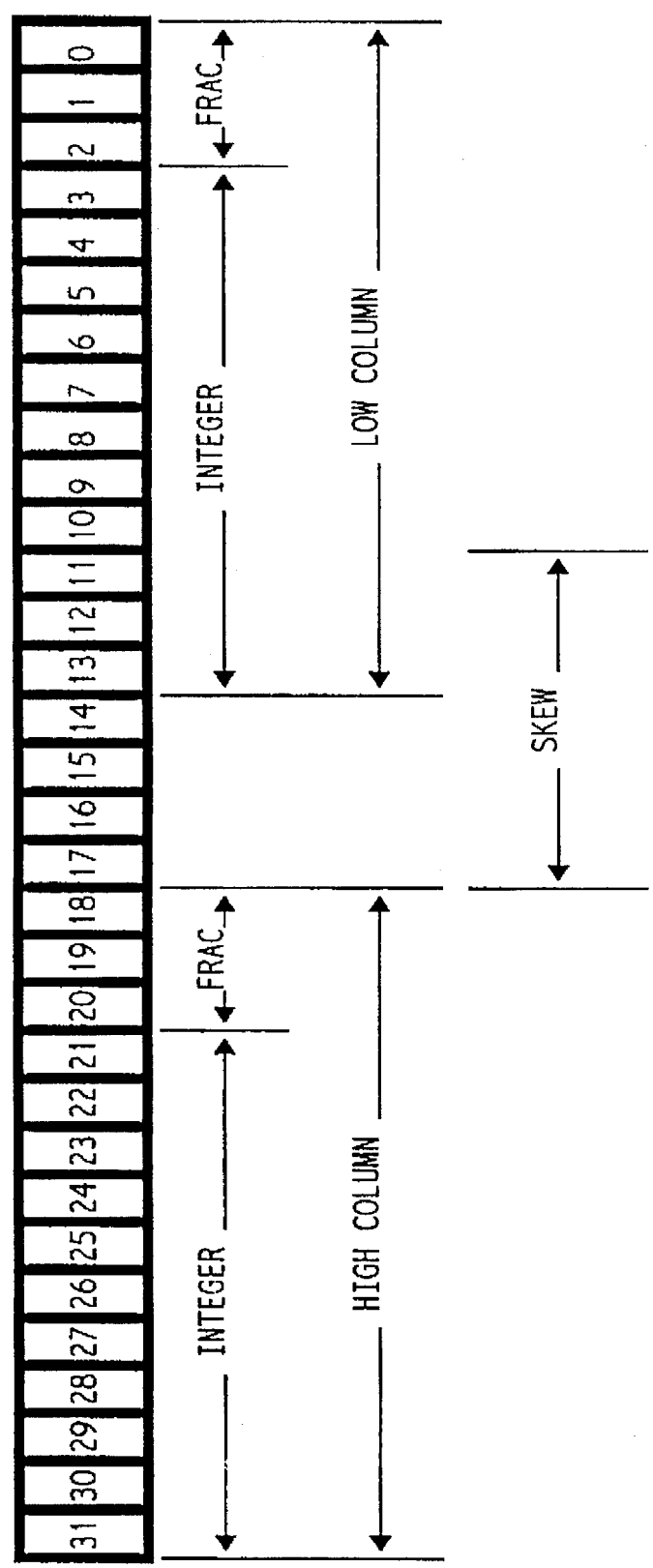
FIG. 9 is a representation of a 32-bit register into which the contributions to the intermediate coefficients of two columns are accumulated during the processing of FIG. 8.

Referring now to FIG. 9, there is shown a representation of a 32-bit register into which the contributions to the ICs of two columns are accumulated. For example, when Equation (1) is implemented, the contributions to the intermediate coefficients for columns 0 and 2 of the current row are accumulated into a 32-bit register IC02, where the IC for column 0 is accumulated into bits 18–31 and the IC for column 2 is accumulated into bits 0–13. The addition of the skew value affects bits 11–17. When the contributions are accumulated, the sign of the low order field extends through the skew field and the high-order field. The addition of the skew value assures that the sign extension does not extend into the high-order field. The magnitude of the skew values is selected to ensure that the highorder field will not be affected by the skew field throughout the column transform processing.

In the forward-mapping phase of the FDST of FIG. 8, the processing of steps 802–808 is as follows:

(1) Select row 0 as the current row of the input block;

(2) Select column 0 as the current column of the input block to select the current input;

(3) Use the current input as an index into the appropriate lookup table to retrieve the entry that represents the IC contributions for column 0 and column 2 and add the retrieved entry into register IC02;

(4) Use the current input as an index into the appropriate lookup table to retrieve the entry that represents the IC contributions for column 1 and column 3 and add the retrieved entry into register IC13;

(5) Use the current input as an index into the appropriate lookup table to retrieve the entry that represents the IC contributions for column 4 and column 6 and add the retrieved entry into register IC46;

(6) Use the current input as an index into the appropriate lookup table to retrieve the entry that represents the IC contributions for column 5 and column 7 and add the retrieved entry into register IC57;

(7) Repeat steps (3)–(6) for each of columns 1–7;

(8) Use current row as an index into the SKEW lookup table to retrieve the skew value for the current row and add the retrieved skew value into registers IC02, IC13, IC46, and IC57;

(9) Store the accumulated values in registers IC02, IC13, IC46, and IC57 to memory retaining the pseudo-SIMD format for use during the second (i.e., computational) phase of FDST processing and initialize the registers;

(10) Repeat steps (2)–(9) for rows 1–7.

Thus, in this forward-mapping, pseudo-SIMD implementation, four registers are used to accumulate the four IC pairs, where each input is used to generate another term in all of Equations (1)–(4) before selecting the next input.

In this pseudo-SIMD implementation of the IDST processing of FIG. 8, the first phase uses four table lookups for each input of each row plus one SKEW table lookup for each row, for a total of 264 table lookups, as compared to the 512 table lookups used for the serial implementation described in the previous section. Moreover, the pseudo-SIMD implementation uses 8 different lookup tables (i.e., PxxxPyyy or PxxxNyyy) plus the relatively small SKEW lookup table, as compared with the 11 lookup tables used for the serial implementation.

Those skilled in the art will understand that the SKEW table can be eliminated by "unrolling" the code for the loop corresponding to the different rows, where, for the code for each different row, the skew value is coded as a constant.

Second Phase: Column Transform

After completing the forward mapping of the first phase of FDST processing, the second phase is performed. In the second phase, the column transform is applied in a computational manner to the intermediate coefficients that were generated in the first phase. In the pseudo-SIMD implementation, the sixteen ICs for columns 0 and 2 (i.e., eight for column 0 and eight for column 1) are stored in pseudo-SIMD fashion as eight 32-bit values, as shown in FIG. 9. The column transform is applied computationally to these eight 32-bit values to generate the transform coefficients for column 0 and 2 simultaneously.

The computational column transform is presented in the following pseudo-code:

```
Q4 = ICxy[4] + ICxy[7];           //skew = 16 * 2048
Q5 = ICxy[5] + ICxy[6];           //skew = 8 * 2048
Q6 = ICxy[5] - ICxy[6];           //skew = 8 * 2048
Q7 = ICxy[4] - ICxy[7];           //skew = 16 * 2048
R4 = Q4 + Q5 - 16*2048;           //skew = 8 * 2048
R5 = Q4 - Q5;                     //skew = 8 * 2048
R6 = 9/16 Q7 - 11/8 Q6 + 18*2048; //skew = 16 * 2048
R7 = 9/16 Q6 + 11/8 Q7 - 37*1024; //skew = 8 * 2048
Q0 = ICxy[0] + ICxy[3];           //skew = 24 * 2048
Q1 = ICxy[1] + ICxy[2];           //skew = 8 * 2048
Q2 = ICxy[1] - ICxy[2];           //skew = 8 * 2048
Q3 = ICxy[0] - ICxy[3];           //skew = 24 * 2048
R0 = Q0 + Q2 - 16*2048;           //skew = 16 * 2048
R1 = Q0 - Q1;                     //skew = 16 * 2048
Cxy[4] = R1 + R5;                 //skew = 24 * 2048
Cxy[5] = R1 - R5;                 //skew = 8 * 2048
R2 = 9/16 Q3 - 11/8 Q2 + 11*1024; //skew = 8 * 2048
R3 = 9/16 Q2 + 11/8 Q3 - 43*1024; //skew = 16 * 2048
Cxy[6] = R6 - R2;                 //skew = 8 * 2048
Cxy[7] = R6 + R2;                 //skew = 24 * 2048
```

-continued

```
Cxy[0] = R0 + R4;              //skew = 24 * 2048
Cxy[2] = R3 - R7;              //skew = 8 * 2048
S3 = R3 + R7;                  //skew = 24 * 2048
S4 = R0 - R4;                  //skew = 8 * 2048
Cxy[1] = 1/2 S3 + 7/8 S4 - 3*2048;   //skew = 16 * 2048
Cxy[3] = 7/8 S3 - 1/2 S4 - 1*2048;   //skew = 16 * 2048
``` where:

ICxy[r] is the 32-bit value corresponding to the intermediate coefficients for row r of columns x and y; and Cxy[r] is the 32-bit value corresponding to the transform coefficients for row r of columns x and y.

The multiplications by fractions are preferably implemented by shifts, adds, and subtracts. Not shown is the fact that the insignificant fractional bits shifted down from the high-order field are masked off, so that they do not propagate into the skew and low-order fields. Care is exercised to assure that only the insignificant fractional bits are masked off, not the skew field. This masking operation makes the skew useful, because otherwise the masking operation would damage the sign-extension of the low-order field.

The final skews for rows 0–7 are 24*2048, 16*2048, 8*2048, 16*2048, 24*2048, 8*2048, 8*2048, and 24*2048, respectively. These values do NOT overlap the significant portions of either the low-order or high-order fields. To extract the coefficient from the low-order field, the register is shifted left by 18 bits, then right by 21 bits with sign extension deleting the insignificant fractional bits in the process. To extract the high-order field, the register is shifted right by 21 bits, deleting the insignificant fractional bits in the process.

In the second (i.e., computational) phase of the FDST of FIG. 8, the processing of steps 810–812 is as follows:

(1) Apply the column transform computationally to the eight pseudo-SIMD IC02 values to generate eight pseudo-SIMD C02 values, and shift the pseudo-SIMD registers to retrieve the eight transform coefficients for column 0 and the eight transform coefficients for column 2;

(2) Apply the column transform computationally to the eight pseudo-SIMD IC13 values to generate eight pseudo-SIMD C13 values, and shift the pseudo-SIMD registers to retrieve the eight transform coefficients for column 1 and the eight transform coefficients for column 3;

(3) Apply the column transform computationally to the eight pseudo-SIMD IC46 values to generate eight pseudo-SIMD C46 values, and shift the pseudo-SIMD registers to retrieve the eight transform coefficients for column 4 and the eight transform coefficients for column 6; and (4) Apply the column transform computationally to the eight pseudo-SIMD IC57 values to generate eight pseudo-SIMD C57 values, and shift the pseudo-SIMD registers to retrieve the eight transform coefficients for column 5 and the eight transform coefficients for column 7.

Thus, the pseudo-SIMD implementation uses only four computational column transforms, as compared to the eight computational column transforms used in the serial implementation.

Since the pseudo-SIMD implementation of the (8×8) transform uses fewer table lookups, fewer lookup tables, and fewer computational column transforms than the serial implementation, the pseudo-SIMD implementation is faster and uses less memory for lookup tables than the serial implementation for a given computer system.

Alternative Embodiments

In the preferred embodiment of the present invention of FIG. 8, a forward discrete slant transform is applied to an (8×8) block of inputs (i.e., either pixels or pixel differences) to generate an (8×8) block of transform coefficients. Those skilled in the art will understand that other embodiments of the present invention fall within the scope of the present invention. For example, the transform can be applied to blocks of size other than (8×8). Furthermore, the invention applies to any two-dimensional transform that can be decomposed into two one-dimensional transforms, such as other slant transforms or discrete cosine transforms. The decomposition into a first, forward-mapping phase and a second, computational phase may be either "first row then column" or "first column then row".

In addition, the invention applies to applications other than video conferencing, such as any application in which video images, or even still images, are encoded using a decomposable two-dimensional transform.

The present invention can be embodied in the form of computer-implemented processes and apparatuses for practicing those processes, as well as in the form of computer programs embodied in tangible media, such as floppy diskettes, CD-ROMs, hard drives, or any other computer-readable medium, wherein, when the computer program is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding images, comprising the steps of:

(1) applying a first one-dimensional transform of a separable two-dimensional transform to input signals corresponding to a block of image signals to generate intermediate signals using forward mapping, wherein the input signals are used as indices to lookup tables that indicate contributions of the input signals to the intermediate signals; and (2) applying a second one-dimensional transform of the two-dimensional transform to the intermediate signals to generate transformed signals.

2. The process of claim 1, wherein step (2) comprises the step of applying the second one-dimensional transform computationally.

3. The process of claim 1, wherein step (1) comprises the step of accumulating the contributions of the input signals to the intermediate signals in a pseudo-SIMD fashion.

4. The process of claim 1, wherein step (2) comprises the step of applying the second one-dimensional transform using pseudo-SIMD processing.

5. The process of claim 1, wherein:

the first one-dimensional transform is a row transform; and the second one-dimensional transform is a column transform.

6. The process of claim 1, wherein the two-dimensional transform is one of a discrete cosine transform and a discrete slant transform.

7. The process of claim 1, wherein the input signals correspond to one of pixels and pixel differences.

8. The process of claim 1, wherein:

the input signals correspond to one of pixels and pixel differences;

the two-dimensional transform is one of a discrete cosine transform and a discrete slant transform;

the first one-dimensional transform is a row transform;

the second one-dimensional transform is a column transform;

each entry of each of the lookup tables comprises the contributions to two intermediate signals stored in a pseudo-SIMD fashion;

step (1) comprises the step of accumulating the contributions of the input signals to the intermediate signals in a pseudo-SIMD fashion; and step (2) comprises the step of applying the second one-dimensional transform computationally to two sets of intermediate signals simultaneously in a pseudo-SIMD fashion.

9. An apparatus for encoding images, comprising (1) means for applying a first one-dimensional transform of a separable two-dimensional transform to input signals corresponding to a block of image signals to generate intermediate signals using forward mapping, wherein the input signals are used as indices to lookup tables that indicate contributions of the input signals to the intermediate signals; and (2) means for applying a second one-dimensional transform of the two-dimensional transform to the intermediate signals to generate transformed signals.

10. The apparatus of claim 9, wherein means (2) is adapted to apply the second one-dimensional transform computationally.

11. The apparatus of claim 9, wherein means (1) is adapted to accumulate the contributions of the input signals to the intermediate signals in a pseudo-SIMD fashion.

12. The apparatus of claim 9, wherein means (2) is adapted to apply the second one-dimensional transform using pseudo-SIMD processing.

13. The apparatus of claim 9, wherein:

the first one-dimensional transform is a row transform; and the second one-dimensional transform is a column transform.

14. The apparatus of claim 9, wherein the two-dimensional transform is one of a discrete cosine transform and a discrete slant transform.

15. The apparatus of claim 9, wherein the input signals correspond to one of pixels and pixel differences.

16. The apparatus of claim 9, wherein:

the input signals correspond to one of pixels and pixel differences;

the two-dimensional transform is one of a discrete cosine transform and a discrete slant transform;

the first one-dimensional transform is a row transform;

the second one-dimensional transform is a column transform;

each entry of each of the lookup tables comprises the contributions to two intermediate signals stored in a pseudo-SIMD fashion;

means (1) is adapted to accumulate the contributions of the input signals to the intermediate signals in a pseudo-SIMD fashion; and means (2) is adapted to apply the second one-dimensional transform computationally to two sets of intermediate signals simultaneously in a pseudo-SIMD fashion.

17. A computer program embodied in a tangible medium, wherein, when the computer program is loaded into and executed by a computer:

the computer applies a first one-dimensional transform of a separable two-dimensional transform to input signals corresponding to a block of image signals to generate intermediate signals using forward mapping, wherein the input signals are used as indices to lookup tables that indicate contributions of the input signals to the intermediate signals; and the computer applies a second one-dimensional transform of the two-dimensional transform to the intermediate signals to generate transformed signals.

18. The computer program of claim 17, wherein, when the computer program is loaded into and executed by the computer, the computer applies the second one-dimensional transform computationally.

19. The computer program of claim 17, wherein, when the computer program is loaded into and executed by the computer, the computer accumulates the contributions of the input signals to the intermediate signals in a pseudo-SIMD fashion.

20. The computer program of claim 17, wherein, when the computer program is loaded into and executed by the computer, the computer applies the second one-dimensional transform using pseudo-SIMD processing.

21. The computer program of claim 17, wherein, when the computer program is loaded into and executed by the computer:

the first one-dimensional transform is a row transform; and the second one-dimensional transform is a column transform.

22. The computer program of claim 17, wherein, when the computer program is loaded into and executed by the computer, the two-dimensional transform is one of a discrete cosine transform and a discrete slant transform.

23. The computer program of claim 17, wherein, when the computer program is loaded into and executed by the computer, the input signals correspond to one of pixels and pixel differences.

24. The computer program of claim 17, wherein, when the computer program is loaded into and executed by the computer:

the input signals correspond to one of pixels and pixel differences;

the two-dimensional transform is one of a discrete cosine transform and a discrete slant transform;

the first one-dimensional transform is a row transform;

the second one-dimensional transform is a column transform;

each entry of each of the lookup tables comprises the contributions to two intermediate signals stored in a pseudo-SIMD fashion;

the computer accumulates the contributions of the input signals to the intermediate signals in a pseudo-SIMD fashion; and the computer applies the second one-dimensional transform computationally to two sets of intermediate signals simultaneously in a pseudo-SIMD fashion.

25. A computer-implemented process for decoding encoded images, comprising the steps of:

(A) decoding encoded signals corresponding to an image; and (B) displaying the decoded image signals, wherein the encoded signals were generated by:

(1) applying a first one-dimensional transform of a separable two-dimensional transform to input signals corresponding to a block of image signals to generate intermediate signals using forward mapping, wherein the input signals are used as indices to lookup tables that indicate contributions of the input signals to the intermediate signals; and (2) applying a second one-dimensional transform of the two-dimensional transform to the intermediate signals to generate transformed signals.

26. The process of claim 25, wherein step (2) comprises the step of applying the second one-dimensional transform computationally.

27. The process of claim 25, wherein step (1) comprises the step of accumulating the contributions of the input signals to the intermediate signals in a pseudo-SIMD fashion.

28. The process of claim 25, wherein step (2) comprises the step of applying the second one-dimensional transform using pseudo-SIMD processing.

29. The process of claim 25, wherein:

the first one-dimensional transform is a row transform; and the second one-dimensional transform is a column transform.

30. The process of claim 25, wherein the two-dimensional transform is one of a discrete cosine transform and a discrete slant transform.

31. The process of claim 25, wherein the input signals correspond to one of pixels and pixel differences.

32. The process of claim 25, wherein:

the input signals correspond to one of pixels and pixel differences;

the two-dimensional transform is one of a discrete cosine transform and a discrete slant transform;

the first one-dimensional transform is a row transform;

the second one-dimensional transform is a column transform;

each entry of each of the lookup tables comprises the contributions to two intermediate signals stored in a pseudo-SIMD fashion;

step (1) comprises the step of accumulating the contributions of the input signals to the intermediate signals in a pseudo-SIMD fashion; and step (2) comprises the step of applying the second one-dimensional transform computationally to two sets of intermediate signals simultaneously in a pseudo-SIMD fashion.

33. An apparatus for decoding encoded images, comprising:

(A) means for decoding encoded signals corresponding to an image; and (B) means for displaying the decoded image signals, wherein the encoded signals were generated by:

(1) applying a first one-dimensional transform of a separable two-dimensional transform to input signals corresponding to a block of image signals to generate intermediate signals using forward mapping, wherein the input signals are used as indices to lookup tables that indicate contributions of the input signals to the intermediate signals; and (2) applying a second one-dimensional transform of the two-dimensional transform to the intermediate signals to generate transformed signals.

34. The apparatus of claim 33, wherein step (2) comprises the step of applying the second one-dimensional transform computationally.

35. The apparatus of claim 33, wherein step (1) comprises the step of accumulating the contributions of the input signals to the intermediate signals in a pseudo-SIMD fashion.

36. The apparatus of claim 33, wherein step (2) comprises the step of applying the second one-dimensional transform using pseudo-SIMD processing.

37. The apparatus of claim 33, wherein:

the first one-dimensional transform is a row transform; and the second one-dimensional transform is a column transform.

38. The apparatus of claim 33, wherein the two-dimensional transform is one of a discrete cosine transform and a discrete slant transform.

39. The apparatus of claim 33, wherein the input signals correspond to one of pixels and pixel differences.

40. The apparatus of claim 33, wherein:

the input signals correspond to one of pixels and pixel differences;

the two-dimensional transform is one of a discrete cosine transform and a discrete slant transform;

the first one-dimensional transform is a row transform;

the second one-dimensional transform is a column transform;

each entry of each of the lookup tables comprises the contributions to two intermediate signals stored in a pseudo-SIMD fashion;

step (1) comprises the step of accumulating the contributions of the input signals to the intermediate signals in a pseudo-SIMD fashion; and step (2) comprises the step of applying the second one-dimensional transform computationally to two sets of intermediate signals simultaneously in a pseudo-SIMD fashion.

41. A computer program embodied in a tangible medium, wherein, when the computer program is loaded into and executed by a computer:

the computer decodes encoded signals corresponding to an image; and the computer displays the decoded image signals, wherein the encoded signals were generated by:

(1) applying a first one-dimensional transform of a separable two-dimensional transform to input signals corresponding to a block of image signals to generate intermediate signals using forward mapping, wherein the input signals are used as indices to lookup tables that indicate contributions of the input signals to the intermediate signals; and (2) applying a second one-dimensional transform of the two-dimensional transform to the intermediate signals to generate transformed signals.

42. The computer program of claim 41, wherein step (2) comprises the step of applying the second one-dimensional transform computationally.

43. The computer program of claim 41, wherein step (1) comprises the step of accumulating the contributions of the input signals to the intermediate signals in a pseudo-SIMD fashion.

44. The computer program of claim 41, wherein step (2) comprises the step of applying the second one-dimensional transform using pseudo-SIMD processing.

45. The computer program of claim 41, wherein:

the first one-dimensional transform is a row transform; and the second one-dimensional transform is a column transform.

46. The computer program of claim 41, wherein the two-dimensional transform is one of a discrete cosine transform and a discrete slant transform.

47. The computer program of claim 41, wherein the input signals correspond to one of pixels and pixel differences.

48. The computer program of claim 41, wherein:

the input signals correspond to one of pixels and pixel differences;

the two-dimensional transform is one of a discrete cosine transform and a discrete slant transform;

the first one-dimensional transform is a row transform;

the second one-dimensional transform is a column transform;

each entry of each of the lookup tables comprises the contributions to two intermediate signals stored in a pseudo-SIMD fashion;

step (1) comprises the step of accumulating the contributions of the input signals to the intermediate signals in a pseudo-SIMD fashion; and step (2) comprises the step of applying the second one-dimensional transform computationally to two sets of intermediate signals simultaneously in a pseudo-SIMD fashion.

* * * * *